(12) United States Patent
Peng et al.

(10) Patent No.: US 11,567,393 B1
(45) Date of Patent: Jan. 31, 2023

(54) LIGHTING ACCESSORY AND PHOTOGRAPHIC LAMP

(71) Applicant: Aputure Imaging Industries Co., Ltd., Guangdong (CN)

(72) Inventors: Daoyou Peng, Guangdong (CN); Yong Zhang, Guangdong (CN); Xin Long, Guangdong (CN)

(73) Assignee: APUTURE IMAGING INDUSTRIES CO., LTD., Guangdong (CN)

( * ) Notice: Subject to any disclaimer, the term of this patent is extended or adjusted under 35 U.S.C. 154(b) by 0 days.

(21) Appl. No.: 17/878,376

(22) Filed: Aug. 1, 2022

(30) Foreign Application Priority Data

Dec. 3, 2021 (CN) .......................... 202111469043.0

(51) Int. Cl.
 *G03B 15/06* (2021.01)
(52) U.S. Cl.
 CPC .................................... *G03B 15/06* (2013.01)
(58) Field of Classification Search
 CPC ....................................................... G03B 15/06
 See application file for complete search history.

(56) References Cited

U.S. PATENT DOCUMENTS

| | | | | |
|---|---|---|---|---|
| 2,831,104 A | * | 4/1958 | Brandt | G03B 15/06 362/16 |
| D585,582 S | * | 1/2009 | Campbell | D26/88 |
| 9,121,572 B2 | * | 9/2015 | Lewis | F21V 17/002 |
| 2002/0112386 A1 | * | 8/2002 | Thomas | G09F 13/04 40/554 |
| 2003/0218883 A1 | * | 11/2003 | Thevenot | B44C 5/005 362/362 |
| 2005/0111228 A1 | | 5/2005 | Chen | |

FOREIGN PATENT DOCUMENTS

| | | |
|---|---|---|
| CN | 206039119 U | 3/2017 |
| CN | 210179411 U | 3/2020 |
| CN | 213019081 U | 4/2021 |
| CN | 213659157 U | 7/2021 |

* cited by examiner

*Primary Examiner* — Evan P Dzierzynski
(74) *Attorney, Agent, or Firm* — Brooks Kushman P.C.

(57) ABSTRACT

This application provides a lighting accessory and a photographic lamp. The lighting accessory includes a light-transmission member, a light-shielding member and a connection assembly. The light-transmission member and the light-shielding member are both in a shape of a hollow cylinder. The light-transmission member includes a cylindrical first light-transmission surface and a flat second light-transmission surface blocked at one end of the first light-transmission surface. An inner cavity of the hollow cylinder of the light-transmission member is configured to accommodate a lamp body. The light-shielding member is arranged round an outer side of the first light-transmission surface and is spaced from the first light-transmission surface in a radial direction. The light-transmission member, the light-shielding member and the lamp body are connected through the connection assembly. The connection assembly also enables the light-emitting surface of the lamp body to be opposite to the first light-transmission surface.

18 Claims, 5 Drawing Sheets

LIGHTING ACCESSORY AND PHOTOGRAPHIC LAMP

CROSS-REFERENCE TO THE RELATED APPLICATION

Pursuant to 35 U.S.C. § 119 and the Paris Convention, this application claims the benefit of Chinese Patent Application No. 202111469043.0 filed Dec. 3, 2021, the content of which is incorporated herein by reference.

FIELD

The present application relates to the field of film-and-television light technologies, and particularly relates to a lighting accessory and a photographic lamp.

BACKGROUND

In film-and-television, video, and advertisement shootings, professional lighting equipment is often required to illuminate and light a subject to be shot, to make the captured image more effective. Common lighting equipment may include a soft light, a flash light, etc. The soft light can convert rigid direct light into soft diffused light. Under a soft-light effect, the light will be soft without obvious shadows, and the highlight spots on an object to be photographed are eliminated, which makes the reflected shape and color of the object more natural, giving people a soft and delicate feeling. A soft-light lamp for photography includes a lamp body and related soft-light accessories (a diffuser, a soft-light box, etc.). The lamp body usually has a spot lamp body and a panel lamp body. Compared with the spot lamp body, the panel lamp body has a larger light-emitting surface, and can meet a wide range of lighting requirements. In an actual lighting process, different types of diffusers are often needed for different types of lamp bodies. For example, most of the spot lamps are suitable for semi-circular or lantern-type diffusers, while in terms of physically structure, it may be difficult to match a flat lamp body structure of the panel lamp with a semicircular or lantern-type diffuser. Thus, the existing soft-light accessories have poor adaptability and poor lighting effect of soft light.

SUMMARY

An aspect of embodiments of the present application provides a lighting accessory and a photographic lamp, to solve the problems in the existing technologies that the soft-light accessories have poor adaptability and the lighting effect of the soft light is not good.

In accordance with an embodiment of the present application, a lighting accessory is provided, which includes a light-transmission member, a light-shielding member, and a connection assembly.

The light-transmission member is provided in a shape of a hollow cylinder and includes a first light-transmission surface and a second light-transmission surface that can uniformly transmit light. The first light-transmission surface is in a cylindrical shape, and the second light-transmission surface is in a planar shape and is blocked at one end of the first light-transmission surface. A cavity formed by the first light-transmission surface and the second light-transmission surface is configured to accommodate a lamp body.

The light-shielding member is arranged around an outer side of the first light-transmission surface, and is spaced from the first light-transmission surface in a radial direction, to shield light transmitted from the first light-transmission surface.

The connection assembly includes a fixing seat, and connection members. The connection members are configured to connect the light-transmission member and the light-shielding member to the fixing seat, respectively. The fixing seat is configured to fix the lamp body and to enable a light-emitting surface of the lamp body to be opposite to the second light-transmission surface.

In an embodiment, the light-shielding member is disposed co-axially with the first light-transmission surface, and an end plane of the light-shielding member close to the second light-transmission surface is axially extended with respect to the second light-transmission surface.

In an embodiment, a radial distance between the light-shielding member and the first light-transmission surface is in a range of 5-10 cm, and the end plane of the light-shielding member close to the second light-transmission surface is axially extended by 20-30 cm with respect to the second light-transmission surface.

In an embodiment, the light-shielding member includes a plurality of detachable light-shielding units, and the plurality of the light-shielding units are arranged in the circumferential direction of the light-shielding member.

In an embodiment, each of the connection member includes a connection body and connection rings arranged at both ends of the connection body. The fixing seat, the light-transmission member and the light-shielding member are all provided with connection portions corresponding connection rings. The connection rings are correspondingly connected to the connection portions.

In an embodiment, the connection members include first connection members and second connection members, each of the second connection members has a length longer than that of each of the first connection members, and the first connection members are extended along the radial direction of the light-transmission member and are evenly arranged in a circumferential direction of the light-transmission member for connecting the light-transmission member to the fixing seat. The second connection members are extended along a radial direction of the light-shielding member and are evenly arranged in a circumferential direction of the light-shielding member for connecting the light-shielding member to the fixing seat.

In an embodiment, the fixing seat includes an annular pan, the annular pan is provided with connection portions in the circumferential direction, and the first connection member and the second connection member are alternately connected to the connection portion.

In an embodiment, the fixing seat also includes a reinforcement portion and a stepped structure vertically connected to the reinforcement portion, the reinforcement portion and the annular part are spaced apart in an axial direction of the light-transmission member, and are arranged in parallel. The stepped structure is arranged between the reinforcement portion and the annular part for connecting the reinforcement portion and the annular part. The reinforcement portion and the annular part are respectively located at two opposite sides of the stepped structure. The reinforcement portion has an installation hole in consistent with an axial direction of the light-transmission member. The installation hole is configured for a detachable installation of the lamp body.

In an embodiment, both the light-transmission member and the light-shielding member are made of flexible materials. The lighting accessory also includes a first support member and a second support member. The first support member is disposed at an axial end portion of the first light-transmission surface for supporting the first light-transmission surface. The second support member is disposed at an axial end portion of the light-shielding member for supporting the light-shielding member.

In an embodiment, the present application further provides a photographic lamp. The photographic lamp includes a lamp body and the lighting accessory as above-mentioned. The lamp body is installed in the lighting accessory through the fixing seat.

Beneficial effects of the lighting accessory provided by the present application are that: The lighting accessory of the present application is provided with a light-transmission member in a hollow cylindrical shape, and the light-transmission member includes a first light-transmission surface and a second light-transmission surface both can uniformly transmit light. The first light-transmission surface is cylindrical. The second light-transmission surface is flat and is blocked at one end of the first light-transmission surface, and a cavity formed by the first light-transmission surface and the second light-transmission surface is configured to accommodate a lamp body. Light emitted by the lamp body, after being uniformly transmitted through the light-transmission member, becomes soil light. The lighting accessory is then provided with a light-shielding member, and the light-shielding member is arranged around an outer side of the first light-transmission surface and is space form the first light-transmission surface in a radial direction. The light-shielding member, on the one hand, can shield the light transmitted from the first light-transmission surface, enabling the soft light to be concentrated and emitted from the second light-transmission surface, on the other hand, the light-shielding member is arranged to be spaced from the light-transmission member in the radial direction, also enabling the second light-transmission surface to have a larger light-emitting surface and enabling the light transmitted to be softer, which is conducive to a wider range of soft light distribution. The lighting accessory is also provided with a connection assembly, and the connection assembly connects the light-transmission member, the light-shielding member and the lamp body, and enables the light-emitting surface of the lamp body to be opposite to the first light-transmission surface to form a simple and reliable connection between the lighting accessory and the lamp body. Compared with the existing semi-circular or lantern-type soft light accessories, the lighting accessory of the present application has a hollow cylinder double cover structure, which can achieve a good effect of soft light distribution in a specific direction, meanwhile the hollow cylindrical inner cavity of this structure can also provide a larger installation space for accommodating a panel-type lamp body as well as lamp bodies having a tubular structure, so the adaptability is higher.

The beneficial effects of the photographic lamp provided by the present application are the same as those of the lighting accessory as above-mentioned in accordance with the present application, which will not be repeated here.

BRIEF DESCRIPTION OF DRAWINGS

In order to illustrate the embodiments of the present application more clearly, the following will briefly introduce the drawings that need to be used for describing the embodiments or the existing technologies. Obviously, the drawings in the following description are merely some embodiments of the present application, and for those of ordinarily skills in the art, other drawings may also be obtained according to these drawings on the premise of paying no creative labor.

Figure 1:
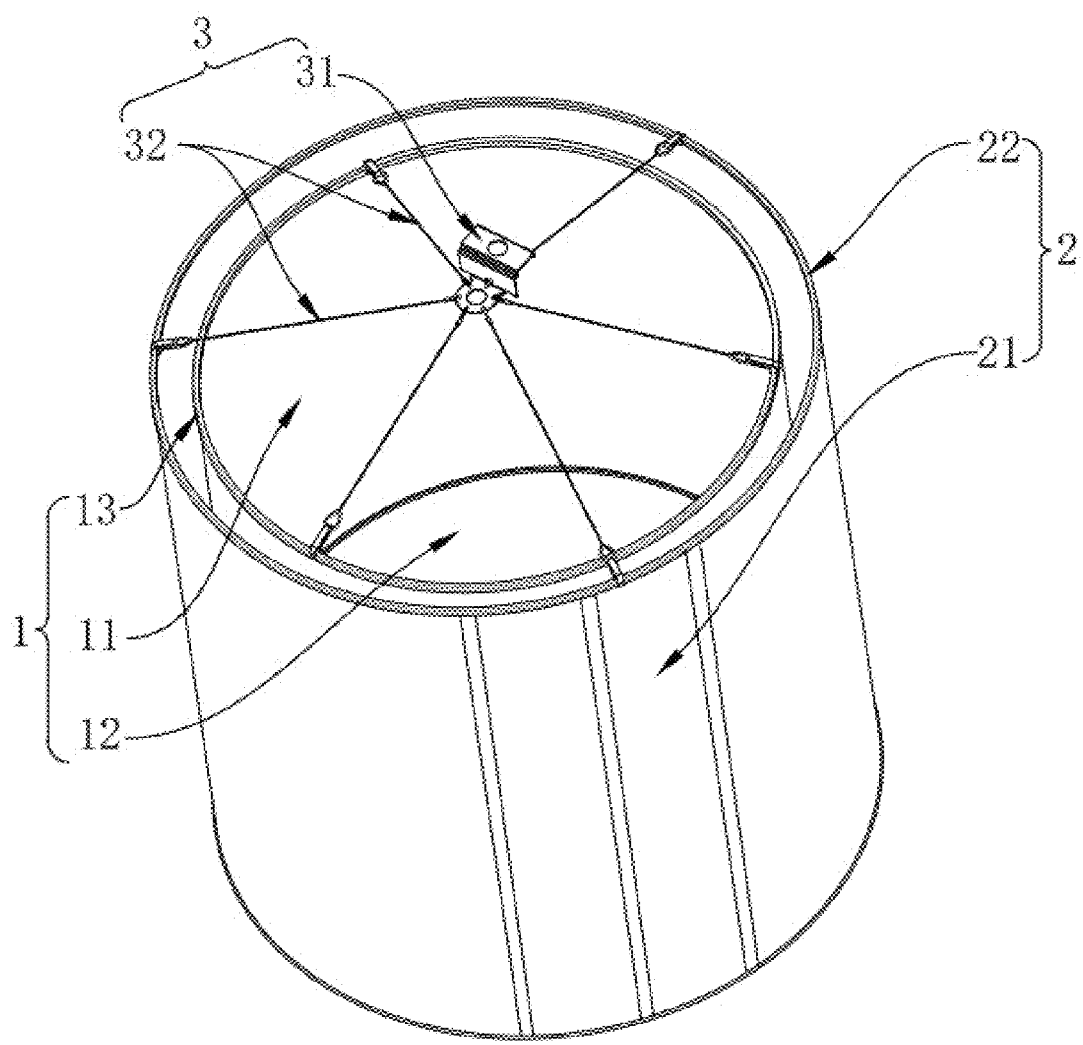
FIG. 1 is a schematic structural diagram of a lighting accessory in accordance with an embodiment of the present application.

Reference signs in the figures are listed as follows:
1—light-transmission member; 11—first light-transmission surface; 12—second light-transmission surface, 13—first support member; 2—light-shielding member; 21—light-shielding unit; 22—second support member; 3—connection assembly; 31—fixing seat; 311—annular part; 3111—connection through-hole; 3112— central through-hole; 312—reinforcement portion; 3121—installation hole; 313—stepped structure; 32—connection member; 321—first connection member; 3211—connection body; 3212, connection ring; 322, second connection member; and 4—lamp body.

DETAILED DESCRIPTION OF EMBODIMENTS

In order to illustrate the objectives, schemes and advantages of the present application more clearly, the embodiments of the present application will be further described in detail below with reference to the drawings. It should be understood that the specific embodiments described herein are merely intended to explain the present application, but not to limit the present application.

It should be noted that when an element is referred to as being "fixed to" or "disposed on" another element, it may be directly or indirectly on the other element. When an element is referred to as being "connected to" another element, it may be directly or indirectly connected to the other element.

It should be understood that orientations or positional relationships indicated by terms "length," "width," "upper," "lower," "vertical," "horizontal," "top," "bottom," "inner," "outer" and the like, are based on the orientations or positional relationships shown in the drawings, which are only intended to facilitate description of the present application and simplify the description, rather than to indicate or imply that a device or an element referred to must have a specific orientation, be constructed and operated in a specific orientation, and thus cannot be construed as a limitation on this application.

In addition, the terms "first" and "second" are used only for descriptive purposes, and should not be construed as indicating or implying relative importance or implying the number of the indicated features. Thus, a feature defined as "first" or "second" may expressly or implicitly include one or more of that feature. In the description of the present application, a phrase "a/the plurality of" means two or more, unless otherwise expressly and specifically defined.

Figure 2:
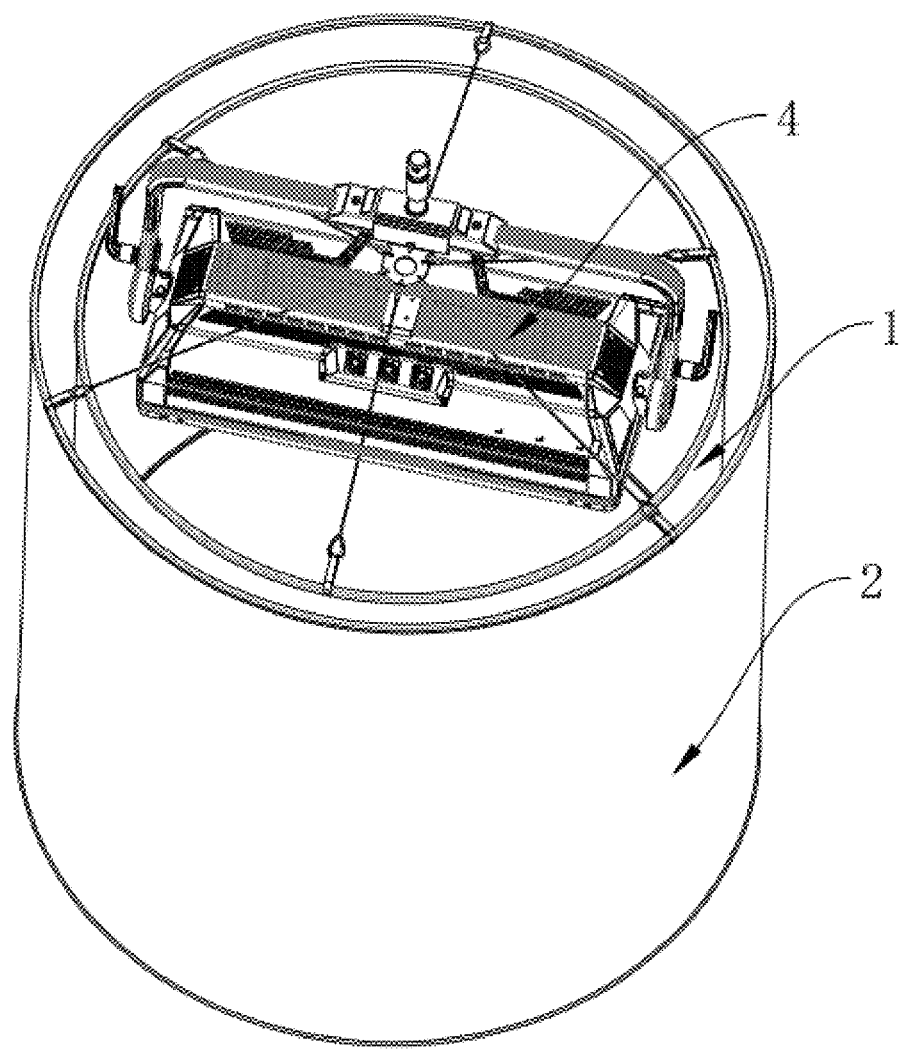
FIG. 2 is a schematic diagram of an overall structure of a photographic lamp in accordance with an embodiment of the present application.

Referring to FIG. 1 and FIG. 2, a lighting accessory in accordance with an embodiment of the present application will now be described. In this embodiment, the lighting accessory includes a light-transmission member 1, a light-shielding member 2 and a connection assembly 3. The light-transmission member 1 is provided in a shape of a hollow cylinder and includes a first light-transmission surface 11 and a second light-transmission surface 12 both can uniformly transmit light. The first light-transmission surface 11 is in a cylindrical shape, i.e., a circumferential curved surface of the light-transmission member 1. The second light-transmission surface 12 is in a planar shape and is blocked at one end of the first light-transmission surface 11. A cavity formed by the first light-transmission surface 11 and the second light-transmission surface 12 is configured to accommodate a lamp body 4. The light emitted by the lamp body 4 can be send out with a soft effect due to the first light-transmission surface 11 of the light-transmission member 1 and the second light-transmission surface 12 located at a bottom end of the first light-transmission surface 11. Preferably, the light-transmission member 1 is in a hollow cylindrical shape having an open top end and a closed bottom end, in this circumstance, a circumferential curved surface is the first light-transmission surface 11, and a bottom closed surface is the second light-transmission surface 12. The lamp body 4 may be installed in a cylindrical cavity of the light-transmission member 1 through an opening at the top of the light-transmission member 1. In other embodiments, after the lamp body 4 is installed in the cavity through the opening of the light-transmission member 1, the opening of the light-transmission member 1 may also be blocked to form a relatively closed cavity for accommodating the lamp body 4, to reduce influence on the soft effect of light due to dust and other sundries etc. entering into the cylindrical cavity of the light-transmission member 1 and falling onto the second light-transmission surface 12 after a long-term use.

Referring to FIG. 1, the light-shielding member 2 is arranged around an outer side of the first light-transmission surface 11 and is spaced from the first light-transmission surface 11 in a radial direction. The light-shielding member 2 may be configured to shield the light transmitted from the first light-transmission surface 11. On the one hand, the light-shielding member 2 is configured to shield the light transmitted from the first light-transmission surface 11, so that the soft light can be concentrated and emitted from the second light-transmission surface 12, which is conducive to soft light distribution for the object to be photographed. On the other hand, the light-shielding member 2 is arranged to be spaced from the light-transmission member 1 in the radial direction, so that the second light-transmission surface 12 can have a larger light-emitting surface and the light transmitted will be softer, which is beneficial for the soft light distribution.

Preferably, the light-shielding member 2 is made of a light-tight material, such as black textile material, etc. The light-shielding member 2 is preferably in a hollow cylindrical shape, and the light-shielding member 2 is disposed around the outer side of the first light-transmission surface 11 of the light-transmission member 1. That is, the first light-transmission surface 11 is completely covered by the light-shielding member 2, so that the light transmitted from the first light-transmission surface 11 is blocked. The black textile material used enables the light-shielding member 2 to absorb light. Due to the light absorption effect of the light-shielding member 2, the light emitted by the lamp body 4 will not leak from the opening at the top of the light-transmission member 1. In the end, the light emitted by the lamp body 4 can only be shot out from the second light-transmission surface at the bottom of the light-transmission member 1 and from the opening at the bottom of the light-shielding member 2, thereby enabling the soft light to be projected in a specific direction. In an actual shooting process, the object to be photographed may be placed within a range of light transmitted from the second light-transmission surface 12 to perform a shooting in a desired soft-light effect.

In an exemplary embodiment, referring to FIG. 1, the connection assembly 3 includes a fixing seat 31, and connection members 32. The connection members 32 are configured to connect the light-transmission member 1 and the light-shielding member 2 to the fixing seat 31, respectively. The fixing seat 31 is configured to fix the lamp body 4, and the light-emitting surface of the lamp body 4 is arranged to be opposite to the second light-transmission surface 12.

Preferably, referring to FIG. 1, the fixing seat 31 is arranged on a central axis of the cylindrical cavity of the light-transmission member 1 and is located at the top opening position of the light-transmission member 1. The lamp body 4 may be fixedly installed through the fixing seat 31, specifically by screwing, riveting, clamping, or other connection manners. The installation manner of the fixing seat 31 and the lamp body 4 can ensure that the light-emitting surface of the lamp body 4 is disposed toward the second light-transmission surface 12. Meanwhile, the light-transmission member 1 and the light-shielding member 2 may also fixed on the fixing seat 31 through the connection members 32. In this embodiment, multiple components are connected and fixed through the fixing seat 31, thus the overall connection structure of the lighting accessory is simple and stable.

Compared with the existing technologies, the lighting accessory provided by the present application includes a light-transmission member 1 provided in a hollow cylindrical shape. The light-transmission member 1 includes first and second light-transmission surfaces 11, 12 that enable light to be uniformly transmitted. The first light-transmission surface 11 is cylindrical, the second light-transmission surface 12 is flat and is blocked at one end of the first light-transmission surface 11, and a cavity formed by the first light-transmission surface 11 and the second light-transmission surface 12 is used to accommodate the lamp body 4. The light emitted by the lamp body 4, after being uniformly transmitted through the light-transmission member 1, becomes soft light. The light-shielding member 2 is arranged around an outer side of the first light-transmission surface 11 and is spaced from the first light-transmission surface 11 in a radial direction. The light-shielding member 2, on the one hand, can shield the light transmitted from the first light-transmission surface 11, enabling the soft light to be concentrated and emitted from the second light-transmission surface 12, on the other hand, the light-shielding member 2 is arranged to be spaced from the light-transmission member 1 in the radial direction, also enabling the second light-transmission surface 12 to have a larger light-emitting surface and thus the light transmitted will be more softer, which is conducive to a wider range of soft light distribution.

By providing the connection assembly 3 to connect the light-transmission member 1, the light-shielding member 2 and the lamp body 4, and disposing the light-emitting surface of the lamp body 4 to be opposite to the second light-transmission surface 12, a simple and reliable connection relationship can be formed between the lighting accessory and the lamp body 4. Compared with the existing semicircular or lantern-type soft light accessories, the lighting accessory of the present application has a hollow cylindrical double cover structure. The hollow cylindrical cavity herein can provide a larger installation space for accommodating a panel-type lamp body, while ensuring a good soft-light effect, and obviously, the lamp body having a tubular structure with a smaller space can also be accommodated, so the adaptability is higher.

In another embodiment of the present application, referring to FIG. 1, the light-shielding member 2 is coaxially disposed with the first light-transmission surface 11, and an end plane of the light-shielding member 2 close to the second light-transmission surface 12 is extended in an axial direction with respect to the second light-transmission surface 12.

In this embodiment, the light-shielding member 2 and the first light-transmission surface 11 are coaxially arranged, and between the light-shielding member 2 and the first light-transmission surface 11, an interval is provided. The coaxial arrangement enables the light emitted by the lamp body 4 to pass through the second light-transmission surface 12 of the light-transmission member 1 and the opening at the bottom end of the light-shielding member 2, to achieve 360 degrees of uniform light, that is, the length of the light in all directions is the same, avoiding the situation that the light length is different, the light is not uniform.

In this embodiment, the bottom plane of the light-shielding member 2 and the second light-transmission surface 12 of the light-transmission member 1 are not on the same plane, that is, they are not flush. The end plane of the light-shielding member 12 close to the second light-transmission surface 12 is axially extended with respect to the second light-transmission surface 12, that is, the second light-transmission surface 12 of the light-transmission member 1 is inside the cylindrical cavity of the light-shielding member 2. The bottom plane of the light-shielding member 2, with respect to the second light-transmission surface 12, has a distance in the axial direction of the light-shielding member 2 instead of being kept flush. For example, the bottom plane of the light-shielding member 2 facing the second light-transmission surface 12 is lower than the second light-transmission surface 12, such that the light leakage of the light-transmission member 1 can be reduced, the beam angle can be adjusted appropriately, the large-angle light emitted from the second light-transmission surface 12 can be blocked, and the stray light emitted from the extra-large angle can be prevented, thereby avoiding the stray light from affecting the shooting, and thus the light emitted by lamp body 4 can be softer.

In another embodiment of the present application, preferably, a radial distance between the light-shielding member 2 and the first light-transmission surface 11 may be 5-10 cm, such as 5 cm, 7 cm, 10 cm, etc. An axial distance between the second light-transmission surface 12 and the end plane of the light-shielding member 2 close to the second light-transmission surface 12, may be 20-30 cm, such as 20 cm, 25 cm, 30 cm, etc.

Based on multiple comparison tests, it is noticed that the best soft-light effect given by the lighting accessory, that is most conducive to a light distribution for photographing, can be achieved when the distance between the coaxially arranged light-shielding member 2 and the first light-transmission surface 11 is within a range of 5-10 cm, at this time, the light derived from the second light-transmission surface 12 and the opening at the bottom of the light-shielding member 2 has little stray light, and meanwhile a larger area of light-emitting can be ensured. In other embodiments, this distance may be adjusted according to the size of a light-emitting, surface of a product. For example, this distance for the lamp body having a small light-emitting surface may also be less than 5 cm, such as 3 cm, etc., and this distance for the lamp body having a large light-emitting surface may also be larger than 10 cm, such as 12 or 15 cm, etc., the specific arrangement of this distance may be adjusted proportionally according to the size of the whole assembly.

Based on multiple comparison tests, it is noticed that the best soft-light effect that is more conducive to a light distribution for photographing, can be achieved when the distance between the second light-transmission surface 12 and the end plane of the light-shielding member 2 close to the second light-transmission surface 12 in an axial direction is in a range of 20-30 cm. In other embodiments, this distance can be adjusted according to the size of the light-emitting surface of the product. For example, this distance for the lamp body having a small light-emitting surface may also be less than 20 cm, such as 15 cm, etc., and this distance for the lamp body having a large light-emitting surface may also be larger than 30 cm, such as 35 cm, etc., the specific arrangement of this distance may be adjusted proportionally according to the size of the whole assembly.

In another embodiment of the present application, referring to FIG. 1, the light-shielding member 2 includes a plurality of detachable light-shielding units 21, and the plurality of light-shielding units 21 are arranged in a circumferential direction of the light-shielding member 2.

In this embodiment, the light-shielding member 2 is formed by the plurality of detachable light-shielding units 21 connected to each other. For example, the circumferential curved surface of the light-shielding member 2 can be divided into multiple curved surfaces along the axial direction, and each curved surface serves as a light-shielding unit 21. Two adjacent curved surfaces are detachably connected, for example, the two adjacent curved surfaces may be connected by means of Velcro, snaps, zippers, etc. In this embodiment, when a certain soft-light effect is required, for example, when the light-shielding member 2 does not need to fully surround the light-transmission member 1 in the circumferential direction, one or more of the light-shielding units 21 can be selectively removed, or can be rolled up, to realize the soft-light effect in different directions. For example, the light-shielding member 2 may shield only half, or ¼, or ¾, etc. of the light transmitting member 1 along the circumferential direction of the light transmitting member 1. Such a design of the detachable light-shielding unit 21, the lighting accessory in this embodiment can be applied to a wider range of requirements for photographing, and achieves soft-light effects at different angles.

Figure 3:
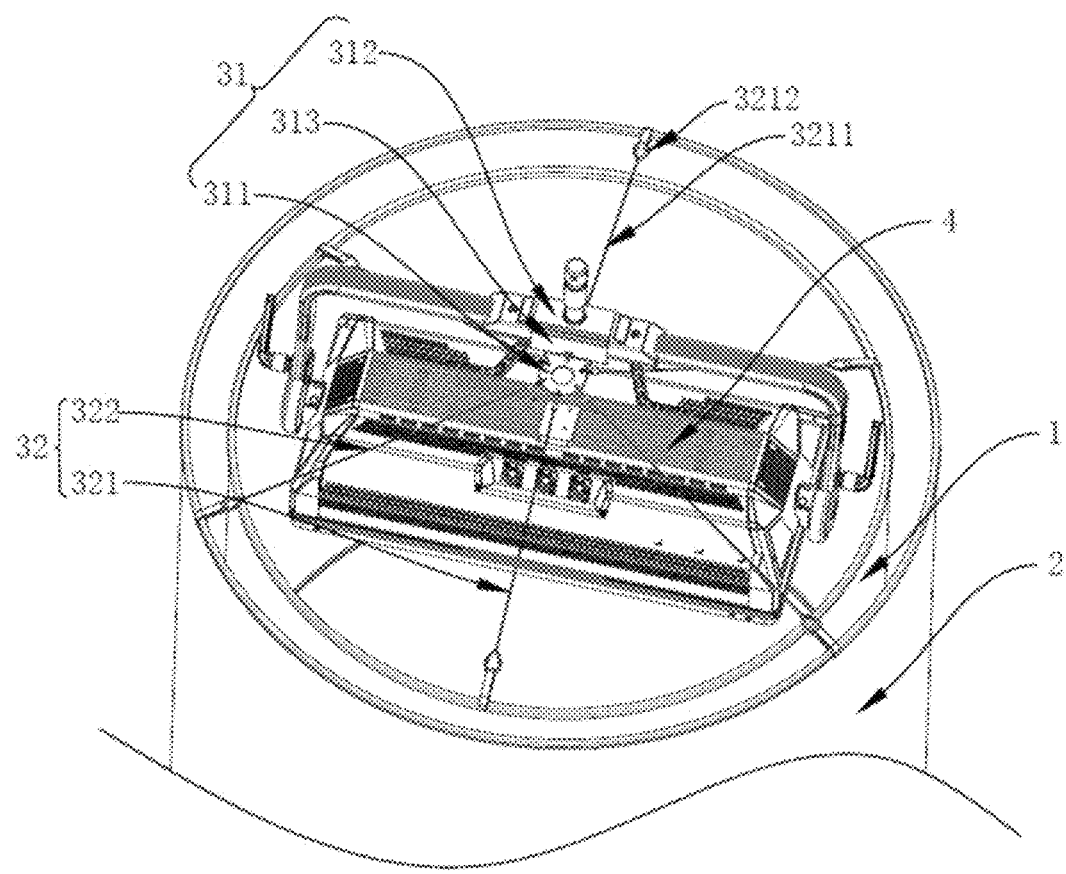
FIG. 3 is a partial enlarged schematic diagram of FIG. 2.
Figure 4:
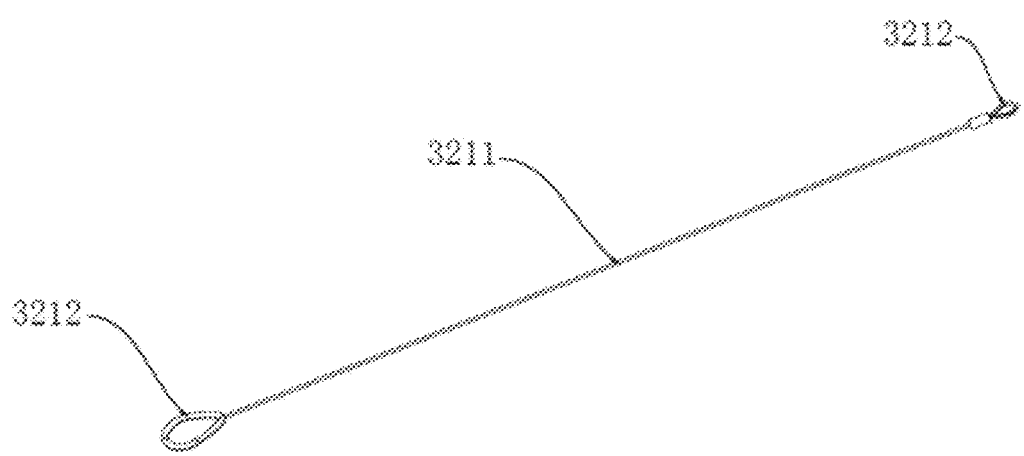
FIG. 4 is a schematic structural diagram of a connection member in accordance with an embodiment of the present application.

In another embodiment of the present application, referring to FIGS. 3 and 4, each connection member 32 includes a connection body 3211, two connection rings 3212 respectively disposed at both ends of the connection body 3211, The fixed seat 31, the light-transmission member 1 and the light-shielding member 2 are respectively provided with two connection portion corresponding to the two connection ring 3212, and the connection ring 3212 is connected to a corresponding connection portion.

Figure 6:
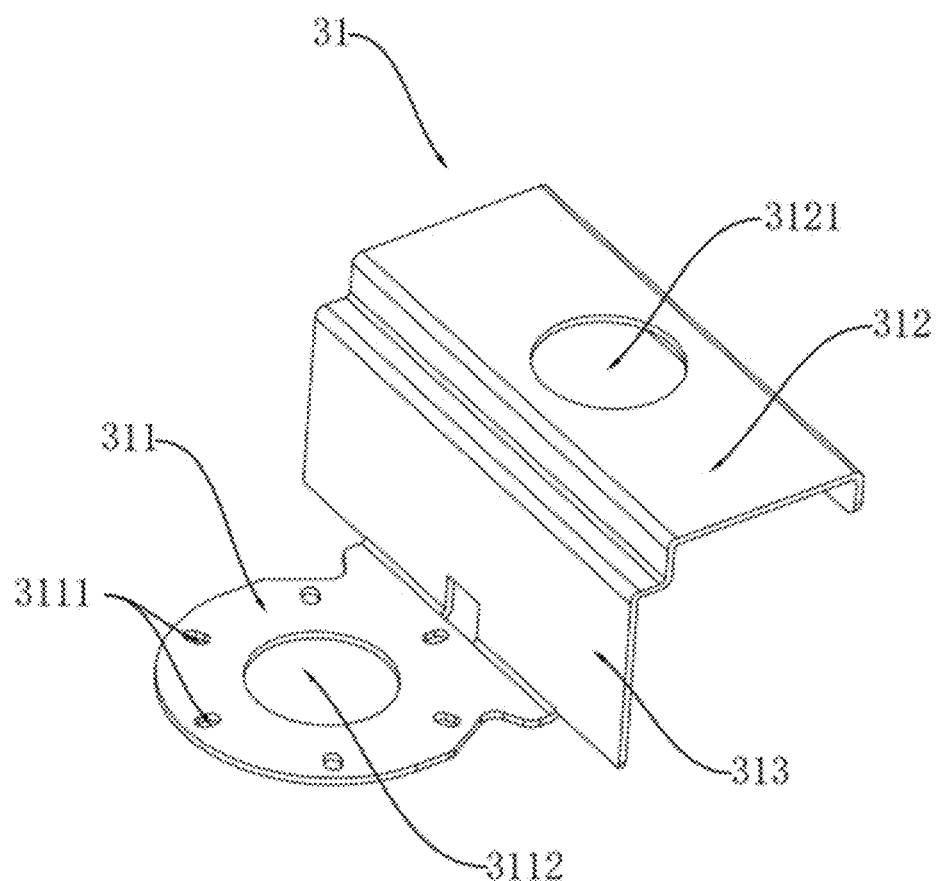
FIG. 6 is a schematic structural diagram of a fixing seat in accordance with an embodiment of the present application.

In this embodiment, the connection member 32 may be a slender connection rope, a connection bar or a connection rod, etc. Preferably, a steel wire may be selected as the connection body 3211, and both ends of the steel wire are provided with a connection ring 3212, respectively. Correspondingly, the connection portions capable of being connected to the connection rings 3212 are provided on the circumferences of the top ends of the light-transmission member 1 and the light-shielding member 2. The connection portion here may be a fixed ring, and the connection ring 3212 may preferably be a detachable retaining ring. The retaining rings may be fastened with the fixed rings on the circumferences of the top ends of the light-transmission member 1 and the light-shielding part 2, to realize a detachable connection. As shown in FIG. 3 and FIG. 6, the connection portion capable of being connected to the connection ring 3212 is provided on the fixing seat 31. The connection portion here may also be a fixed ring, and the connection ring 3212 may be a detachable retaining ring or a non-detachable fixed ring. The connection ring 3212 is connected to the connection portion on the fixing seat 31, to realize a connection among the light-transmission member 1, the light-shielding member 2 and the fixing seat 31. By selecting the steel wire and the connection ring 3212 matching the steel wire, a quick assembly and disassembly of the lighting accessory can be realized, and the assembly efficiency is improved. In other embodiments, the connection member 32 may also be provided in other forms to achieve the quick assembly and fixing among the light-transmission member 1, the light-shielding member 2 and the fixing seat 31.

In another embodiment of the present application, referring to FIG. 1 and FIG. 3, the connection members 32 includes first connection members 321 and second connection members 322, and each of the second connection members 322 has a length longer than that of each of the first connection members 321. The first connection members 321 are extended along a radial direction of the light-transmission member 1 and are evenly arranged in the circumferential direction of the light-transmission member 1 for connecting the light-transmission member 1 and the fixing seat 31. The second connection members 322 are extended along a radial direction of the light-shielding member 2, and are evenly arranged in the circumferential direction of the light-shielding member 2 for connecting the light-shielding member 2 and the fixing seat 31.

In this embodiment, since a diameter of the light-shielding member 2 is larger than a diameter of the light-transmission member 1, the connection members 32 for connecting the light-shielding member 2 and the light-transmission member 1 to the fixing seat 31 may have different lengths, that is, the first connection members 321 for connecting the light-transmission member 1 and the fixing seat 31 may be shorter- and the second connection members 322 for connecting the light-shielding member 2 and the fixing seat 31 may be longer. The first connection members 321 and the second connection members 322 may only be different in length, as shown in FIG. 4, the first connection members 321 and the second connection members 322 have the same structure. The shorter first connection members 321 extend along the radial direction of the light-transmission member 1 and are evenly arranged around the circumference of the light-transmission member 1, and the longer second connection members 322 extend along the radial direction of the light-shielding member 2 and are evenly arranged around the circumference of the light-shielding member 2. Preferably, the first connection members 321 and the second connection members 322 are evenly arranged at intervals. It can be understood that the first connection members 321 and the second connection members 322 may be alternatively arranged at a same interval, for example, one second connection member 322 is disposed between two adjacent first connection members 321, and one first connection member 321 is disposed between two adjacent second connection members 322, an included angle between a first connection member 321 and a second connection members 322 adjacent to the first connection member 321 is 360/N, where N is a total number of first connection members 321 and second connection members 322. The evenly arranged first and second connection members 321, 322 enable the parts members connected with the first connection member 321 and the second connection member 322 to be stressed evenly, so that the fixing manner of the whole lighting accessory is stable and reliable. In another embodiment of the present application, referring to FIG. 3 and FIG. 6, the fixing seat 31 includes an annular part 311. The annular part 311 is provided with a connection portion in the circumferential direction, and the first connection members 321 and the second connection members 322 are alternately connected to the connection portion. It can be understood that one end of the first connection member 321 is connected to the connection portion, and the other end of the first connection member 321 is connected to the light-transmission member 1. Along a circumferential direction of the annular part 311, the second connection member 322 adjacent to the first connection member 321 having one end being connected to the connection portion, the other end is connected to the light-shielding member 2, and so on, so that the first connection members 321 and the second connection members 322 can be arranged along the annular part 311 at even intervals, thereby realizing the support for the light transmitting member 1 and the light-shielding member 2.

In this embodiment, the connection portion provided on the annular part 311 in the circumferential direction, may be a plurality of connection hooks, or may be a plurality of bolts that can be connected to the connection ring 3212 correspondingly, or may be a plurality of protruding structures welded on the annular part 311 in the circumferential direction, where the connection ring 3212 is trapped on the protruding structure. Preferably, the connection portion is a plurality of connection through-holes 3111 evenly defined on the annular part 311 of the fixing seat 31 in the circumferential direction. The connection member 32 such as a steel wire, can be directly connected to the connection through-hole 3111 on the annular part 311 through the connection ring 3212 at the end of the steel wire. In other embodiments, each of the connection through-holes 3111 may be provided with a fixed ring, and the steel wire may be connected to a corresponding fixed ring through the connection ring 3212 at the end of the steel wire. Optionally, the connection ring 3212 at the end of the steel wire to which the annular part 311 is connected may also be a detachable retaining ring. The connection ring 3212 here may also be configured having a non-detachable structure to improve the assembly efficiency. When disassembling the lighting accessory, only the connection rings 3212 at the ends being connected to the light-transmission member 1 and the light-shielding member 2 need to be removed, and the entire connection assembly 3 is disassembled as a whole.

Correspondingly, on the annular part 311, the number of the connection through-holes 3111 is equal to the total number of the first connection members 321 and the second connection members 322, for example, the total number of the first connection members 321 and the second connection members 322 is N, then the number of connection through-holes 3111 is also N.

In other embodiments, the first connection members 321 and the second connection members 322 may also be overlapped, and the overlapped first and second connection members are connected to a same connection through-hole 3111 of the annular part 311. In this circumstance, the number of the connection through holes 3111 is equal to the number of the first connection members 321 or equal to the number of the second connection members 322. In other embodiments, the first connection members 321 and the second connection members 322 may also be arranged in other manners.

In another embodiment of the present application, referring to FIG. 6, the fixing seat 31 also includes a reinforcement portion 312 and a stepped structure 313 vertically connected to the reinforcement portion 312, and the reinforcement portion 312 and the annular part 311 are spaced apart in an axial direction of the light-transmission member 1 and disposed in parallel. The stepped structure 313 is arranged between the reinforcement portion 312 and the annular part 311 for connecting the reinforcement portion 312 and the annular part 311, and the reinforcement portion 312 and the annular part 311 are arranged on two opposite sides of the stepped structure 313. An installation hole 3121 is defined on the reinforcement portion 312 in consistent with an axial direction of the light-transmission member 1, and the installation bole 3121 is configured for a detachable installation of the lamp body 4.

In this embodiment, when the lamp body 4 has a large area, a bracket for the lamp body 4 may be properly strengthened and thickened, resulting in structural interference between the connection members 32 and the lamp body 4, and also it may be difficult to cause the lamp body 4 to be located at the center or approximately the center of the light-transmission member 1. To reduce the interference between the structural components and to achieve a stable connection between the lamp body 4 and the lighting accessory, as well as to effectively ensure that the lamp body 4 is located at the center or approximately the center of the light-transmission member 1, a lamp-body fixing portion needs to be specially reserved on the fixing seat 31. Referring to FIG. 6, the lamp-body fixing portion is the reinforcement portion 312 shown in FIG. 6. The reinforcement portion 312 is connected to the annular part 311. The installation hole 3121 is defined on the reinforcement portion 312 in consistent with an axial direction of the light-transmission member 1. The installation hole 3121 is disposed in consistent with an axial direction of the light-transmission member 1. The lamp body 4 may be installed in the installation hole 3121 through connection members 32 such as screws and bolts. The screws and bolts are arranged in parallel to the axis of the light-transmission member 1, so that the light-emitting surface of the lamp body 4 is perpendicular to the axis of the light-transmission member 1 after the lamp body 4 is installed, that is, the light-emitting surface of the lamp body 4 is disposed towards the second light-transmission surface 12, and a light-emitting direction of the lamp body 4 is parallel to an unfolding direction of the light-transmission member 1. In this installation form, the light emitted by the lamp body 4 will be projected on the second light-transmission surface 12 as much as possible, effectively ensuring that the light-emitting surface of the lamp body 4 is located in the center or approximately the center of the light-transmission member 1, which in turn can enhance the soft-light effect.

During an installation of the lamp body 4, a support shaft of the lamp body 4 and the connection members 32 need to avoid each other in the radial direction of the light-transmission member 1, and the connection members 32 may also need to avoid other structures of the lamp body 4 in the axial direction of the light-transmission member 1. Thus, the stepped structure 313 is provided to connect the reinforcement portion 312 and the annular part 311. The stepped structure 313 enables the reinforcement portion 312 and the annular part 311 to be spaced apart along the axial direction of the light-transmission member 1 and to be disposed in parallel. The stepped structure 313 is located between the reinforcement portion 312 and the annular part 311 for connecting the reinforcement portion 312 and the annular part 311, and the reinforcement portion 312 and the annular part 311 are arranged on the two opposite sides of the stepped structure 313. When necessary, corresponding avoidance holes may be defined on the stepped structure 313 to avoid the connection members 32, and corresponding avoidance vacancies may also be provided near a portion where the annular part 311 and the stepped structure 313 are connected to avoid the connection members 32. The stepped structure 313 enables the connection members 32 to completely avoid the support shaft and other parts of the lamp body 4, so that the risk of structural interference between the overall lighting accessory and the lamp body 4 can be reduced, a more stable and reliable connection can be realized, and thus more different types of lamp bodies 4 can be applied to, such as lamp bodies 4 having a larger volume or area (for example, having a larger light-emitting surface).

In other embodiments, the reinforcement portion 312, the annular part 311 and the stepped structure 313 may be integrally formed, or may be detachably connected.

Referring to FIG. 6, when the lamp body 4 has a small the volume or area (for example, it has a small light-emitting surface), the reinforcement portion 312 may not be additionally provided, while the connection members 32 and the lamp body 4 are connected to the annular part to form a fixed connection. The connection through-holes 3111 in the outer circumferential direction of the annular part 311 are respectively connected with the corresponding connection members 32. The central through-hole 3112 at the center of the annular part 311 serves as the above-mentioned installation hole 3121 and is used for a detachable installation of the lamp body 4. It can be understood that the central through-hole 3112 may be directly connected to the bracket of the lamp body. By sharing the annular part 311 as the fixing seat 31, the structure of the entire connection assembly 3 can be simplified, so that the assembling of the lighting accessory is simpler and more efficient.

Figure 5:
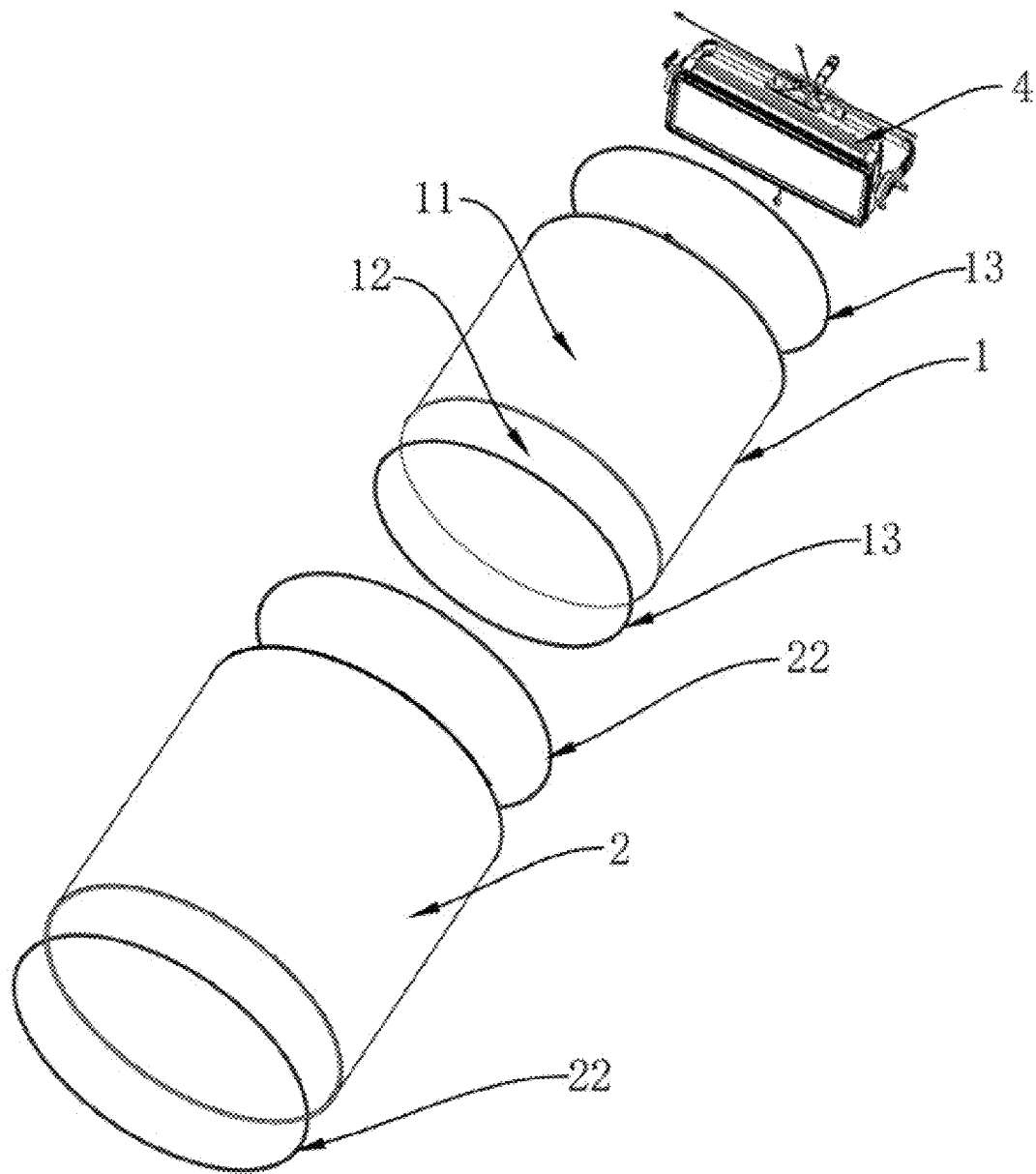
FIG. 5 is a schematic diagram of a disassembled structure of a photographic lamp in accordance with an embodiment of the present application.

In another embodiment of the present application, referring to FIG. 5, the light-transmission member 1 and the light-shielding member 2 are both made of flexible materials, and the lighting accessory also includes a first support member 13 and a second support member 22. The first support member 13 is disposed at an axial end portion of the first light-transmission surface 11 to support the first light-transmission surface 11, and the second support member 22 is disposed at an axial end portion of the light-shielding member 2 to support the light-shielding member 2.

In this embodiment, preferably, the light-transmission member 1 is made of a flexible material capable of transmitting light, such as polyester fiber material, or other materials that can make the light exit uniformly. The light-shielding member 2 is made of a flexible light-tight material, such as black coated shade cloth, or other materials with shade effects.

Since the light-shielding member 2 and the light-transmission member 1 are both hollow cylindrical and made of flexible materials, the first support member 13 is configured to support the flexible material of the light-transmission member 1 in a cylindrical shape, and the second support member 22 is also configured to support the flexible material of the light-shielding member 2 in a cylindrical shape.

Preferably, the first support member 13 and the second support member 22 may be made of materials having a certain weight. For example, the first support member 13 and the second support member 22 both include two steel rings, and the four steel rings are respectively embedded in two ends of the light-shielding member 2 and two ends of the light-transmission member 1, to stretch or roll-up the light-shielding member 2 and the light-transmission member 1. Correspondingly, the top ends of the light-shielding member 2 and the light-transmission member 1 are provided with a plurality of fixed rings in the circumferential direction, and the plurality of fixed rings are configured to fasten with the corresponding connection rings 3212 at the ends of the steel wires. The fixed rings may be connected to the steel ring at the top ends of the light-shielding member 2 and the light-transmission member 1 in the circumferential direction. The diameter of the first support member 13 matches the diameter of the light-transmission member 1, and the diameter of the second support member 22 matches the diameter of the light-shielding member 2. The diameter of the light-shielding member 2 is larger than the diameter of the light-transmission member 1, and thus the diameter of the second support member 22 is larger than that of the first support member 13.

Preferably, two first support members 13 and two second support members 22 are provided, that is, the two first support members 13 are respectively disposed at the top and bottom ends of the light-transmission member 1, and the two second support members 22 are respectively disposed on the top and bottom ends of the light-shielding member 2. In other embodiments, the number of the first support members 3 and the second support members 22 may be other numbers. For example, support members may also be disposed in the middle of the light-transmission member 1 and the light-shielding member 2, respectively, to enhance the stability of the light-transmission member t and the light-shielding member 2.

In this embodiment, when performing an actual soft light distribution, the light-transmission member 1 and the light-shielding member 2 made of flexible materials are unfolded under the support of the corresponding support members. The light-transmission member 1 and the light-shielding member 2 are fixed and spread apart in the radial direction through the first support member 13 and the second support member 22, and are stretched and unfolded without being wrinkled in the vertical direction due to the gravitational effect of the first support member 13 and the second support member 22, and then a vertical hollow cylindrical double cover structure is presented. Thus, the soft-light effect of vertical downward light can be realized when the lamp body 4 is installed in the lighting accessory in this embodiment.

Referring to FIG. 2, the present application also provides a photographic lamp, which includes a lamp body 4, and the lamp body 4 is installed in the lighting accessory through the fixing seat 31.

In this embodiment, the photographic lamp includes a lamp body 4. The lamp body 4 may be provided with structures such as a bracket, a strut, or a shaft, to be connected to the fixing seat 31. The lamp body 4 may be provided in various shapes, such as a panel light, a tube light, a flexible cloth light or a rod light, etc. The lamp body 4 may also be formed by splicing the above types of lights, similar to a lamp that emits light from the surface, such as a splicing lamp similar to the "lamp that emits light from the surface" formed by a splicing of several spotlights, or a flexible cloth lamp (which may be one flexible cloth light or the splicing of multiple flexible cloth lights, etc.), or a splicing lamp, similar to the lamp that emits light from the surface, formed by a splicing of multiple rod lights (long strips). The above-mentioned splicing may be realized by, for example, a Velcro, a magnetic attraction, a buckle or a special splicing structure, which will not be specifically limited here. The lamp body 4 and the above-mentioned lighting accessory can be connected through the fixing seat 31, the lamp body 4 and the lighting accessory can be detachably connected, and the central axis of the light-emitting surface of the lamp body 4 is coincident with or parallel to the axis of the light-transmission member 1, thereby forming a good soft-light effect. The lighting accessory in this embodiment can also be adapted to a space lamp, and in actual use, the lighting accessory and the space lamp are integrated into a suspended ceiling state.

When the lighting accessory is not required, it only needs to remove the detachable retaining rings of the connection members 32 and the corresponding fixed rings, and then the light-shielding member 2 (including the second support members 22), the light-transmission member 1 (including the first support members 13) are removed together. Since the light-shielding member 2 and the light-transmission member 1 are both made of flexible materials, they can be conveniently stored through the supporting steel ring. At this time, the connection members 32 can still be kept on the fixing seat 31 without removal. When needed, the retaining rings on the connection members 32 and the fixed rings at each of the connection portions are correspondingly fasten in the circumferential direction, and then the light-transmission member 1 and the light-shielding member 2 are respectively straightened due to the gravitational effect of the supporting steel ring, to realize the enclosure of the light-transmission member 1 to the lamp body 4 and the enclosure of the light-shielding part 2 to the light-transmission member 1, thereby realizing the soft-light effect pf the lamp body 4.

The lighting accessory of the present application can be well adapted to the panel-type lamp body. The lighting accessory of the present application is also suitable for other types of light sources, such as spot light sources, line light sources, etc., such as multiple spliced spotlights or flexible cloth lights or a lamp body having a larger light-emitting surface formed by a splicing of rod lights, etc., and thus the lighting accessory of the present application has a strong adaptability.

The above descriptions are only preferred embodiments of the present application, and are not intended to limit the present application Any modifications, equivalent replacements and improvements made within the spirit and principles of the present application shall be included within the protection scope of the present application.

What is claimed is:
1. A lighting accessory, comprising:
   a light-transmission member, provided in a shape of a hollow cylinder, and comprising:
     a first light-transmission surface in a cylindrical shape; and
     a second light-transmission surface in a planar shape, and blocked at one end of the first light-transmission surface,
     wherein the first light-transmission surface and the second light-transmission surface are capable of transmitting light uniformly, a cavity formed by the first light-transmission surface and the second light-transmission surface is configured to accommodate a lamp body;
   a light-shielding member, provided in a shape of a hollow cylinder, arranged around an outer side of the first light-transmission surface, and spaced from the first light-transmission surface in a radial direction, wherein the light-shielding member is configured to shield light transmitted from the first light-transmission surface; and a connection assembly, comprising:
a fixing seat; and
connection members, configured to connect the light-transmission member and the light-shielding member to the fixing seat, respectively,
wherein the fixing seat is configured to fix the lamp body and to enable a light-emitting surface of the lamp body to be opposite to the second light-transmission surface.

2. The lighting accessory according to claim 1, wherein the light-shielding member is co-axially disposed with the first light-transmission surface, and an end plane of the light-shielding member close to the second light-transmission surface is axially extended with respect to the second light-transmission surface.

3. The lighting accessory according to claim 2, wherein a radial distance between the light-shielding member and the first light-transmission surface is in a range of 5-10 cm, and the end plane of the light-shielding member close to the second light-transmission surface is axially extended by 20-30 cm with respect to the second light-transmission surface.

4. The lighting accessory according to claim 1, wherein the light-shielding member comprises a plurality of fight-shielding units that are detachable, and the plurality of the light-shielding units are arranged in a circumferential direction of the light-shielding member.

5. The lighting accessory according to claim 1, wherein each of the connection members comprises a connection body, and connection rings disposed at both ends of the connection body, wherein the fixing seat, the light-transmission member, and the light-shielding member are all provided with connection portions corresponding to the connection rings, and the connection rings are correspondingly connected to the connection portions.

6. The lighting accessory according to claim 5, wherein the connection members comprise first connection members and second connection members,
each of the second connection members has a length longer than that of each of the first connection member,
the first connection members are extended along the radial direction of the light-transmission member and are evenly arranged in a circumferential direction of the light-transmission member for connecting the light-transmission member to the fixing seat, and
the second connection members are extended along a radial direction of the light-shielding member and are evenly arranged in a circumferential direction of the light-shielding member for connecting the light-shielding member to the fixing seat.

7. The lighting accessory according to claim 6, wherein the fixing seat comprises an annular part, the annular part is provided with the connection portions in a circumferential direction, and the first connection members and the second connection members are alternately connected to the connection portions.

8. The lighting accessory according to claim 7, wherein the fixing seat further comprises a reinforcement portion and a stepped structure vertically connected with the reinforcement portion,
the reinforcement portion and the annular part are spaced apart in an axial direction of the light-transmission member, and are arranged in parallel,
the stepped structure is arranged between the reinforcement portion and the annular part for connecting the reinforcement portion and the annular part,
the reinforcement portion and the annular part are respectively located at two opposite sides of the stepped structure,
the reinforcement portion has an installation hole in consistent with the axial direction of the light-transmission member, and
the installation hole is configured for a detachable installation of the lamp body.

9. The lighting accessory according to claim 1, wherein the light-transmission member and the light-shielding member are both made of flexible materials, and the lighting accessory further comprises a first support member and a second support member,
the first support member is disposed at an axial end portion of the first light-transmission surface for supporting the first light-transmission surface, and
the second support member is disposed at an axial end portion of the light-shielding member for supporting the light-shielding member.

10. A photographic lamp, comprising:
a lamp body; and
a lighting accessory, comprising:
a light-transmission member, provided in a shape of a hollow cylinder, and comprising:
a first light-transmission surface in a cylindrical shape; and
a second light-transmission surface in a planar shape, and blocked at one end of the first light-transmission surface,
wherein the first light-transmission surface and the second light-transmission surface are capable of transmitting light uniformly, a cavity formed by the first light-transmission surface and the second light-transmission surface is configured to accommodate the lamp body;
a light-shielding member, provided in a shape of a hollow cylinder, arranged around an outer side of the first light-transmission surface, and spaced from the first light-transmission surface in a radial direction, wherein the light-shielding member is configured to shield light transmitted from the first light-transmission surface; and
a connection assembly, comprising:
a fixing seat; and
connection members, configured to connect the light-transmission member and the light-shielding member to the fixing seat, respectively,
wherein the fixing seat is configured to fix the lamp body and to enable a light-emitting surface of the lamp body to be opposite to the second light-transmission surface, and
wherein the lamp body is installed in the lighting accessory through the fixing seat.

11. The photographic lamp according to claim 10, wherein the light-shielding member is co-axially disposed with the first light-transmission surface, and an end plane of the light-shielding member close to the second light-transmission surface is axially extended with respect to the second light-transmission surface.

12. The photographic lamp according to claim 11, wherein a radial distance between the light-shielding member and the first light-transmission surface is in a range of 5-10 cm, and the end plane of the light-shielding member close to the second light-transmission surface is axially extended by 20-30 cm with respect to the second light-transmission surface.

13. The photographic lamp according to claim 10, wherein the light-shielding member comprises a plurality of light-shielding units that are detachable, and the plurality of the light-shielding units are arranged in a circumferential direction of the light-shielding member.

14. The photographic lamp according to claim 10, wherein each of the connection members comprises a connection body, and connection rings disposed at both ends of the connection body, wherein the fixing seat, the light-transmission member, and the light-shielding member are all provided with connection portions corresponding to the connection rings, and the connection rings are correspondingly connected to the connection portions.

15. The photographic lamp according to claim 14, wherein the connection members comprise first connection members and second connection members,
    each of the second connection members has a length longer than that of each of the first connection members,
    the first connection members are extended along the radial direction of the light-transmission member and are evenly arranged in a circumferential direction of the light-transmission member for connecting the light-transmission member to the fixing seat, and
    the second connection members are extended along a radial direction of the light-shielding member and are evenly arranged in a circumferential direction of the light-shielding member for connecting the light-shielding member to the fixing seat.

16. The photographic lamp according to claim 15, wherein the fixing seat comprises an annular part, the annular part is provided with the connection portions in a circumferential direction, and the first connection members and the second connection members are alternately connected to the connection portions.

17. The photographic lamp according to claim 16, wherein the fixing seat further comprises a reinforcement portion and a stepped structure vertically connected with the reinforcement portion,
    the reinforcement portion and the annular part are spaced apart in an axial direction of the light-transmission member, and are arranged in parallel,
    the stepped structure is arranged between the reinforcement portion and the annular part for connecting the reinforcement portion and the annular part,
    the reinforcement portion and the annular part are respectively located at two opposite sides of the stepped structure,
    the reinforcement portion has an installation hole in consistent with the axial direction of the light-transmission member, and
    the installation hole is configured for a detachable installation of the lamp body.

18. The photographic lamp according to claim 10, wherein the light-transmission member and the light-shielding member are both made of flexible materials, and the lighting accessory further comprises a first support member and a second support member,
    the first support member is disposed at an axial end portion of the first light-transmission surface for supporting the first light-transmission surface, and
    the second support member is disposed at an axial end portion of the light-shielding member for supporting the light-shielding member.

\* \* \* \* \*

UNITED STATES PATENT AND TRADEMARK OFFICE
CERTIFICATE OF CORRECTION

| | | |
|---|---|---|
| PATENT NO. | : 11,567,393 B1 | |
| APPLICATION NO. | : 17/878376 | |
| DATED | : January 31, 2023 | |
| INVENTOR(S) | : Daoyou Peng et al. | |

It is certified that error appears in the above-identified patent and that said Letters Patent is hereby corrected as shown below:

In the Claims

Column 15, Lines 28-29, Claim 4:
After "comprises a plurality of"
Delete "fight-shielding" and
Insert -- light-shielding --.

Signed and Sealed this
Twenty-sixth Day of March, 2024

*Katherine Kelly Vidal*

Katherine Kelly Vidal
*Director of the United States Patent and Trademark Office*